(12) United States Patent
Yellapantula et al.

(10) Patent No.: US 10,003,418 B1
(45) Date of Patent: Jun. 19, 2018

(54) PERFORMING PARAMETRIC MEASUREMENT FOR VERIFICATION OF A WIRELESS COMMUNICATION DEVICE

(71) Applicant: LitePoint Corp., Sunnyvale, CA (US)

(72) Inventors: Ramakrishna Yellapantula, Vernon Hills, IL (US); Chandra Punyapu, Aurora, IL (US); Malhar Vaishnav, Gilberts, IL (US); Soumyadeep Banerjee, Arlington Heights, IL (US)

(73) Assignee: LitePoint Corporation, Sunnyvale, CA (US)

( * ) Notice: Subject to any disclaimer, the term of this patent is extended or adjusted under 35 U.S.C. 154(b) by 0 days. days.

(21) Appl. No.: 15/484,348

(22) Filed: Apr. 11, 2017

(51) Int. Cl.
*H04B 17/15* (2015.01)
*H04B 17/10* (2015.01)

(52) U.S. Cl.
CPC ........... *H04B 17/15* (2015.01); *H04B 17/102* (2015.01)

(58) Field of Classification Search
CPC ..... H04B 17/15; H04B 17/102; H04W 24/10; H04W 24/08; H04W 24/00
See application file for complete search history.

(56) References Cited

U.S. PATENT DOCUMENTS

| | | | | |
|---|---|---|---|---|
| 2005/0282571 | A1* | 12/2005 | Oprescu-Surcobe | H04W 28/10 455/503 |
| 2008/0076425 | A1* | 3/2008 | Khetawat | H04W 88/12 455/436 |
| 2012/0184264 | A1* | 7/2012 | Hassett | H04L 43/0852 455/423 |
| 2017/0332265 | A1* | 11/2017 | Lui | H04W 24/08 |
| 2018/0063701 | A1* | 3/2018 | Jin | H04W 8/22 |

OTHER PUBLICATIONS

3GPP, 3GPP TS 24.301 v10.15.0 (Sep. 2014), 3rd Generation Partnership Project; Technical Specification Group Core Network and Terminals; Non-Access-Stratum (NAS) protocol for Evolved Packet System (EPS); Stage 3, Release 10, Sep. 2014, 323 pages.

(Continued)

*Primary Examiner* — Devan Sandiford
(74) *Attorney, Agent, or Firm* — McCracken & Gillen LLC

(57) ABSTRACT

A testing apparatus obtains user equipment (UE) parametric measurements with unknown and/or unavailable authentication and security information. The testing apparatus may obtain uplink and downlink parameters of a wireless device after the wireless device initiates registration while an associated timer is activated, enabling the testing apparatus to obtain additional measurement information without security information about the tested wireless device. The apparatus may also measure the UE's transmitted power level prior to the initiation of the authentication procedure. The testing apparatus may determine if a wireless device is to be tested at another frequency pair. If so, the testing apparatus redirects the wireless device to a radio resource at the other frequency pair. The testing apparatus then obtains uplink and downlink parameters for the wireless device by performing pre-registration and intra-registration measurements at the other frequency pair. The procedure is repeated until measurements for all desired frequency pairs are completed.

23 Claims, 8 Drawing Sheets

(56) References Cited

OTHER PUBLICATIONS

3GPP, 3GPP TS 36.211 v12.8.0 (Dec. 2015), 3rd Generation Partnership Project; Technical Specification Group Radio Access Network; Evolved Universal Terrestrial Radio Access (E-UTRA); Physical Channels and Modulation; Release 12, Dec. 2015, 136 pages.

3GPP, 3GPP TS 36.213 v12.11.0 (Sep. 2016), 3rd Generation Partnership Project; Technical Specification Group Radio Access Network; Evolved Universal Terrestrial Radio Access (E-UTRA); Physical Layer Procedures; Release 12, Sep. 2016, pp. 1-5, 166-219, 220-233 and 234-241.

* cited by examiner

US 10,003,418 B1

PERFORMING PARAMETRIC MEASUREMENT FOR VERIFICATION OF A WIRELESS COMMUNICATION DEVICE

TECHNICAL FIELD

Aspects of the disclosure relate to determining uplink and downlink parametric measurements for a wireless device by an apparatus.

BACKGROUND OF THE INVENTION

Because user experience is an important consideration with Long Term Evolution (LTE), user equipment (UE) testing is extremely important. While LTE is considered as cutting edge in terms of speed and network performance, any degradation of the performance over the uplink and/or downlink between the infrastructure and the UE may tarnish the user's experience.

To match the demanding requirements of LTE wireless devices, it is important to break the design down into subsystems and to build a test plan that allows each part of the design to be characterized thoroughly before testing the complete device. Without this modular approach, the diagnosis of problems may occur so late in the program that it becomes difficult to manage the final release stages, including field trials and compliance testing.

Moreover, effective and expeditious testing of wireless devices supporting future development of wireless technology (e.g., $5^{th}$ generation (5G) wireless systems) becomes even more important to insure a desired user experience.

SUMMARY OF THE INVENTION

An aspect provides an approach to obtain user equipment (UE) parametric measurements with unknown and/or unavailable authentication and security information. For example, with Long Term Evolution (LTE) compatible wireless devices, this may be achieved by measuring the transmitted power level during UE's physical random access channel (PRACH) procedure during initial access to the base station.

With another aspect, a testing apparatus obtains uplink and downlink parameters for a wireless device after the wireless device initiates registration while an associated timer is activated during UE's initial transmissions over a physical uplink shared channel (PUSCH) prior to authentication procedure initiation (pre-authentication measurements). This approach enables the testing apparatus to obtain additional measurement information without security information about the tested wireless device. This approach is advantageous in that the unavailability of authentication and security parameters from the UE may otherwise prevent a test system from fully admitting the UE into a test ecosystem.

With another aspect, the testing time for verifying a wireless device may be significantly reduced because successfully completion for registration (e.g., the attach procedure in accordance with LTE procedures) is not required in order to obtain measurements of uplink and downlink parameters. Consequently, the wireless device can be tested without removal and replacement of the originally installed subscriber identity module (SIM) card with a test universal SIM card. Not only can this reduce testing time, removal of an electronic SIM (e-SIM) card (often implemented as an integrated SIM chip) or hardware SIM card (such as Machine Identification Module MIM) can be difficult.

With another aspect, a testing apparatus determines if a wireless device is to be tested at another frequency pair. If so, the testing apparatus redirects the wireless device to a radio resource at the other frequency pair. The testing apparatus then obtains uplink and downlink parameters for the wireless device by performing initial access and pre-authentication measurements at the other frequency pair. The procedure can be repeated until measurements for all desired frequency pairs are completed.

BRIEF DESCRIPTION OF THE DRAWINGS

The foregoing summary of the invention, as well as the following detailed description of exemplary embodiments of the invention, is better understood when read in conjunction with the accompanying drawings, which are included by way of example, and not by way of limitation with regard to the claimed invention.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized and structural and functional modifications may be made without departing from the scope of the present claimed subject matter.

In accordance with various aspects of the embodiments, methods, computer-readable media, and apparatuses are disclosed to measure uplink and/or downlink parameters of a wireless device without knowledge of security (authentication) information of the wireless device. With traditional approaches, the wireless device completes an authentication procedure, and subsequently, a testing apparatus (which may be based on wireless infrastructure such as an evolved Node B (eNB) in the context of LTE operation) measures/obtains uplink and/or downlink parameters for the wireless device.

Figure 1:
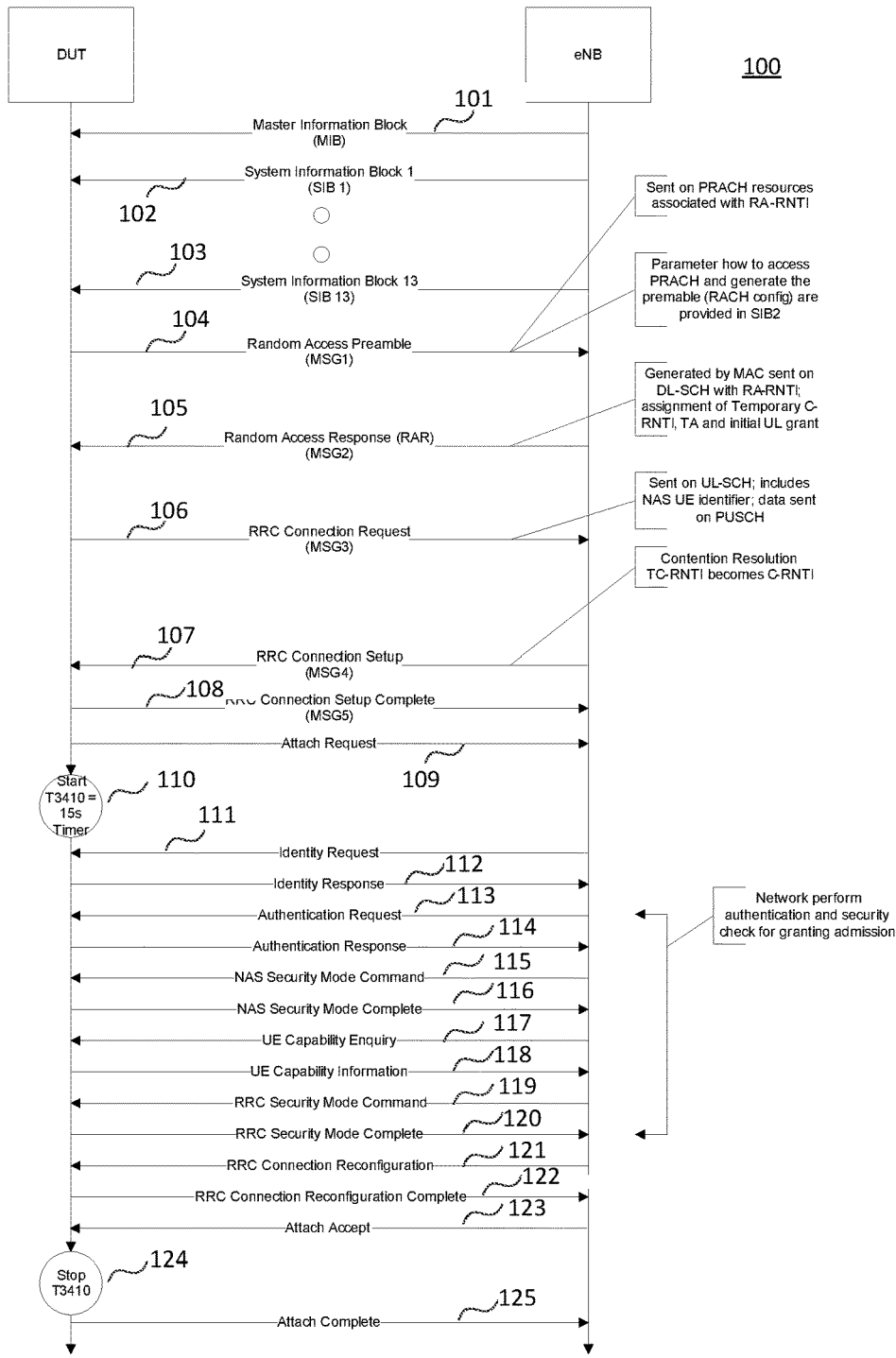
FIG. 1 shows an attach procedure by a wireless device communicating with a wireless infrastructure in accordance with prior art.

FIG. 1 shows attach procedure 100 (comprising messages 101-109, 111-123, and 125) by a wireless device (which may be designated a device under test (DUT)) communicating with a wireless infrastructure in accordance with prior art. The wireless device, which may be referred as user equipment (UE), typically requires registration with the network to receive services. The registration process may be referred to as network attachment. For example, with LTE operation, 3GPP specification TS 24.301 ("Non-Access-Stratum (NAS) protocol for Evolved Packet System (EPS)") defines a timer T3410. The T3410 timer starts at event 110 when the UE sends an attach request message 109 to the network. The T3410 timer gracefully stops at event 124 when the UE receives attach accept 123 message or the attach reject message from the network. If the UE does not receive attach accept message 123 or attach reject message (not explicitly shown) from the network, the T3410 timer expires 15 seconds after it started. At the expiry of the T3410 timer, a T3411 timer starts whereby the UE scans other cells to camp and attach. An objective of the T3410 timer in to provide ample time for the network and UE to complete the normal registration procedure 100 as shown in FIG. 1.

Figure 2:
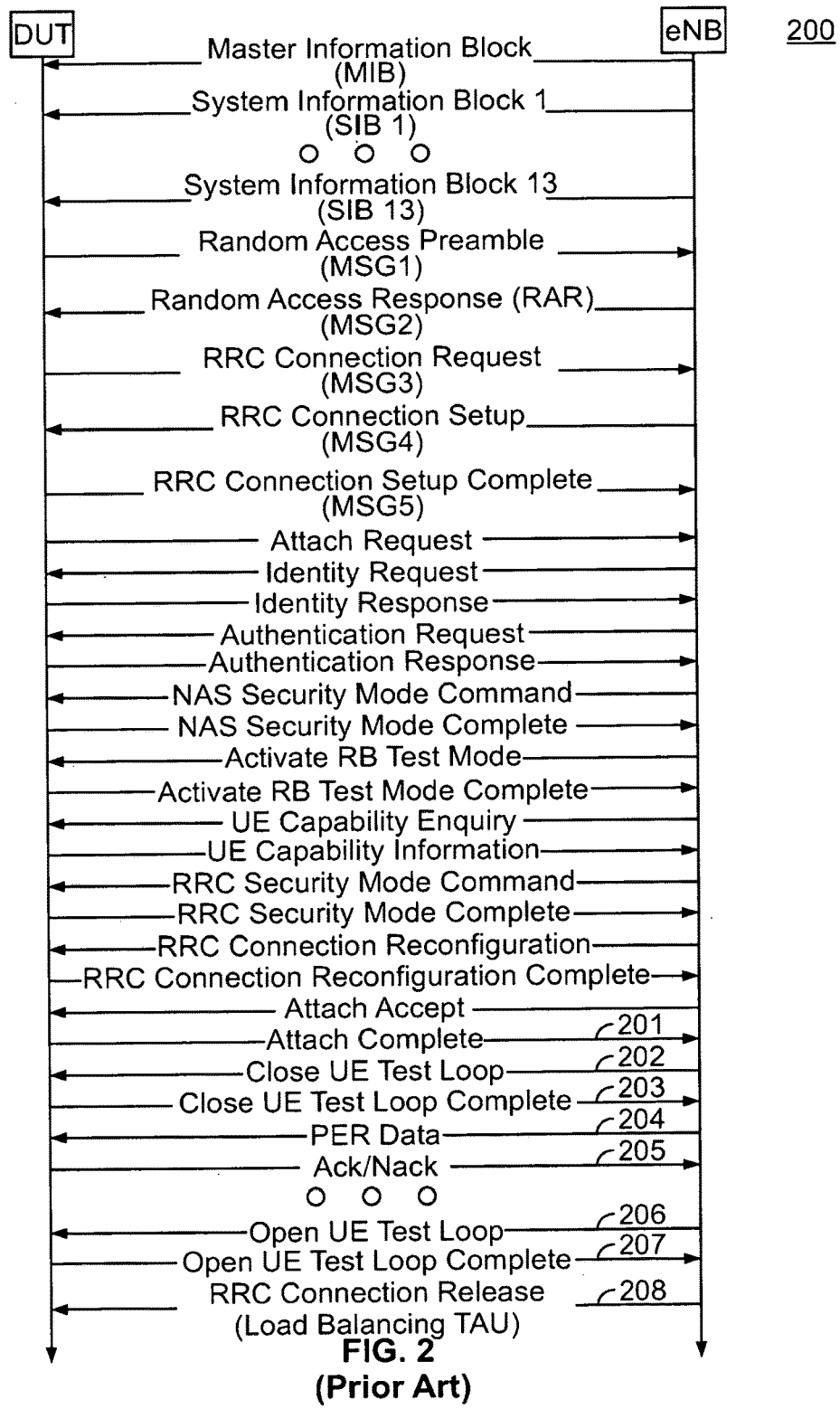
FIG. 2 shows a message scenario in which a testing apparatus performs parametric measurements with a wireless device in accordance with prior art.

FIG. 2 shows procedure 200 in which testing apparatus performs parametric measurements with a wireless device in accordance with prior art. The testing apparatus can obtain parametric measurements (which may be designated as post-registration measurements) only after the wireless device has completed registration (for example in accordance with procedure 100) by returning attach complete message 201 to the testing apparatus (designated as eNB in FIG. 2). The testing apparatus obtains uplink and downlink parameters during a message exchange with the wireless device (messages 202-208) after completion of the registration.

Figure 3:
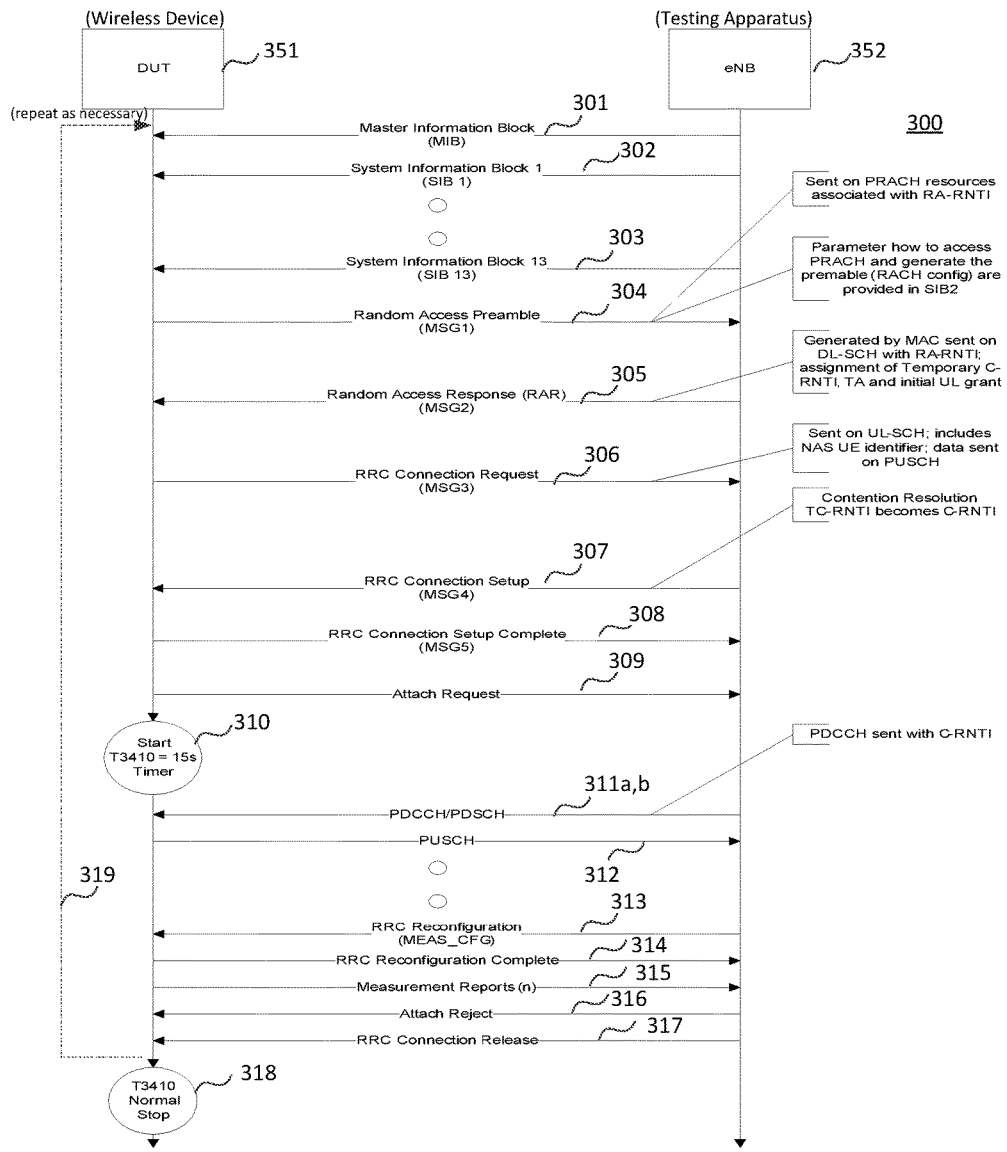
FIG. 3 shows a measurement procedure in which testing apparatus performs parametric measurements in accordance with an embodiment.

FIG. 3 shows procedure 300 in which testing apparatus 352 performs parametric measurements in accordance with an embodiment.

3GPP specification TS 24.301 defines a timer T3410. The T3410 starts when UE 351 sends attach request message 309 to the network. The timer subsequently gracefully stops when UE 351 receives an attach accept message (not explicitly shown) or attach reject message 316 from testing apparatus (network) 352. If UE 351 does not receive an attach accept message or attach reject message 316 from network 352, the T3410 expires 15 seconds after it is started. At the expiry of the T3410, T3411 starts whereby UE 351 scans other cells to camp and attach.

Testing apparatus also obtains the parametric intra-registration measurements for UE 351 with unknown and/or unavailable authentication and security information. This is achieved by measuring the power during UE's PRACH procedure and during UE's initial transmissions over PUSCH prior to authentication procedure initiation. Testing apparatus 352 achieves this by making uplink signal captures for transmissions made by UE 351 during PRACH (MSG1 message 304 as shown in FIG. 3) and PUSCH (MSG3 message 306, MSG5 message 308 as shown in FIG. 3). This measurement approach is advantageous and unique because the unavailability of authentication and security parameters from UE 351 prevents testing apparatus 352 from fully admitting UE 351 into test ecosystem.

Since, the RRC connection remains established while the T3410 is running, procedure 300 takes advantage of this time to complete a set of parametric tests by scheduling downlink and uplink transmission measurements without authenticating UE 351. This approach allows testing apparatus 352 to communicate with UE 351 over the air interface without knowing the security parameters in the subscriber identity module (SIM card) of UE 351 beforehand.

The receipt of attach request message 309 from UE 351 serves as an implicit indication to testing apparatus 352 that the T3410 timer at UE 351 has started. Rather than authenticating UE 351 and continuing the normal attach procedure, testing apparatus 352 sends PDCCH 311a with possible downlink assignment of DCI indications via PDCCH with the corresponding PDSCH 311b filled with a random payload for measuring downlink block error rate (BLER). In the same PDCCH 311a transmission, testing apparatus 352 also includes DCI0 grant for uplink transmission to measure uplink transmit power as well as BLER. When UE 351 receives the PDCCH 311a with its cell radio network temporary identifier (C-RNTI), UE 351 decodes PDSCH 311b data associated with PDCCH 311a and subsequently transmits the random payload on PUSCH 312 at the scheduled uplink transmission opportunity after the receipt of PDCCH 311a with DCI0 (refer FIG. 3). In PUSCH transmission 312, UE 351 also includes the HARQ ACK/NACK based on decoding PDSCH 311b. Testing apparatus 352 uses these uplink transmissions made by UE 351 on PUSCH 312 and consequently analyzes the quality of the uplink channel. Testing apparatus 352 may analyze the received uplink transmission to measure uplink channel quality by comparing the analysis results against user defined thresholds of parametric measurements at the frequency pairs being tested.

The following discussion pertains to the parametric measurements over PRACH transmission and refers to pre-registration measurements, which are obtained before UE 351 sends attach request message 309, which indicates that timer T3410 has started.

A preamble transmission power $P_{PRACH}$ is determined as:

$$P_{PRACH} = \min\{P_{CMAX,c}(i), \text{PREAMBLE\_RECEIVED\_TARGET\_POWER} + PL_c\} \quad (\text{EQ. 1})$$

where:
$P_{CMAX,c}(i)$ is the configured transmit power for UE 351 at in a given subframe of the primary cell. This information is sent to UE 351 in system information block (SIB) 1 message 302 (as shown in FIG. 3) by testing apparatus (eNB) 352. If this information is absent in SIB 1 message 302, UE 351 is expected to apply the maximum power according to the UE capability. If eNB 352 configures the value more than the value supported by UE 351, then UE 351 will set the maximum value to a value as supported by UE capability.

$PL_c$: is the downlink path loss estimate calculated in UE 351 for the primary cell.

$PL_c = P_{refTx} - P_{refRx}$

PREAMBLE_RECEIVED_TARGET_POWER: UE 351 computes this value according to the following calculation.

PREAMBLE_RECEIVED_TARGET_POWER=preambleInitialReceivedTargetPower+DELTA_PREAMBLE+(PREAMBLE_TRANSMISSION_COUNTER−1)*powerRampingStep. In other words, this is a derived power level at which eNB 352 would like to receive for a random access preamble from UE 351. The preambleInitialReceivedTargetPower, DELTA_PREAMBLE, powerRampingStep, and PREAMBLE_TRANSMISSION_COUNTER are sent to UE 351 in SIB 2 (not explicitly shown in FIG. 3) by eNB 352.

Furthermore, simplifying EQ. 1 for measuring the $P_{PRACH}$ $$P_{PRACH} = \text{minimum of } \{P_{CMAX,c}(i), P_{PreambleInitialRxTarget} + \Delta_{Preamble} + ((N_{PremableTxCounter}-1) * P_{PowerRampStep}) + (P_{refTx} - P_{refRx})\} \quad (\text{EQ. 2})$$

When testing apparatus 352 is calibrated with a reference UE with a known form factor under ideal test conditions, it can be derived that $P_{refTx}$ is inversely proportional to $((N_{PreambleTxCounter}-1)*P_{PowerRampStep})$ and for a given $P_{refTx}$, $((N_{PreambleTxCounter}-1)*P_{PowerRampStep})$ can be accurately estimated.

Therefore, according to EQ. 1, once $PL_c$ for UE 351 with a known form factor is measured under ideal test conditions, the received $P_{PRACH}$ from UE 351 under test may be correlated against the expected $P_{PRACH}$ since the parameters for UE 351 to compute the transmit power are known to both eNB 352 and UE 351.

The reliability and validity of the receive and transmit circuitry of UE 351 may be measured by performing a sweep of several transmit power measurements from UE 351 by changing the reference signal power across an acceptable range, for example, every power step reduction in reference signal power should cause the $P_{PRACH}$ power to increase proportionately. Such measurement distributions are then compared to the measurements of reference UE for arriving at a decision on performance of UE 351 under test.

The following discussion pertains to the parametric measurements over PUSCH transmission 312 and refers to intra-registration measurements, which are obtained after UE 351 sends attach request message 309, starting timer T3410.

If UE 351 transmits PUSCH 312 without a simultaneous PUCCH (not explicitly shown in FIG. 3) for the serving cell c, then the UE transmit power $P_{PUSCH,c}(i)$ for PUSCH transmission in sub frame i for the serving cell c is given by $$P_{PUSCH,c}(i) = \min\begin{cases} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{cases} \quad (EQ. 3)$$

If UE 351 transmits PUSCH 312 simultaneous with PUCCH for the serving cell c, then the UE transmit power $P_{PUSCH,c}(i)$ for the PUSCH transmission 312 in sub frame i for the serving cell $$P_{PUSCH,c}(i) = \min\begin{cases} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{cases} \quad (EQ. 4)$$

where:
  $P_{CMAX,c}(i)$ is the configured UE transmit power in subframe i for serving cell c. This information is provided by eNB 352 to UE 351 in SIB 1 message 302.
  $\hat{P}_{CMAX,c(i)}$ is the linear value of $P_{CMAX,c}(i)$.
  $\hat{P}_{PUCCH}(i)$ is the linear value of $\hat{P}_{PUCCH}(i)$.
  $M_{PUSCH,c}(i)$ is the bandwidth of the PUSCH resource assignment expressed in number of resource blocks valid for subframe i and serving cell c. This information is provided by eNB 352 to UE 351 through a DCI0 scheduling.
  $P_{O\_PUSCH,c}(j)$ is a parameter composed of the sum of a component $P_{O\_NOMINAL\_PUSCH,c}(j)$ provided from higher layers for j=0 and 1 and a component $P_{O\_UE\_PUSCH,c}(j)$ provided by higher layers for j=0 and 1 for serving cell c. This information is provided by eNB 352 to UE 351 in the SIB 2 message (not explicitly shown in FIG. 3).
  For j=0 or 1, $\alpha_c \in \{0, 0.4, 0.5, 0.6, 0.7, 0.8, 0.9, 1\}$ is a 3-bit parameter provided by higher layers for serving cell c. For j=2, $\alpha_c(j)$=1. PUSCH (re)transmissions corresponding to a semi-persistent grant then j=0, for PUSCH (re)transmissions corresponding to a dynamic scheduled grant then j=1 and for PUSCH (re)transmissions corresponding to the random access response grant then j=2.
  $PL_c$ Is the downlink path loss estimate calculated in UE 351 for serving cell c in dB.
  $\Delta_{TF,c}(i) = 10\log_{10}((2^{BPRE \cdot K_s} - 1) \cdot \beta_{offset}^{PUSCH})$ For $K_S$=1.25 and 0 for, $K_S$=0 where $K_S$ is given by the parameter deltaMCS-Enabled provided by higher layers for each serving cell c.
  $f_c(i) = f_c(i-1) + \delta_{PUSCH,c}(i-K_{PUSCH})$ if accumulation is enabled based on the parameter Accumulation-enabled provided by higher layers or if the TPC command $\delta_{PUSCH,c}$ is included in a PDCCH with DCI format 0 for serving cell c.

For UEs compliant with Release 12 and below of 3GPP specification TS 24.301, all of the parameters (except for $PL_c$) used by UE 351 to compute $P_{PUSCH,c}(i)$ are either fixed values or computed from a set of known parameters informed by eNB 352 to UE 351. Therefore, with a known $PL_c$ value measured for a golden UE, the principles of the method discussed to verify transmit and receive circuitry through parametric measurements over PRACH can be similarly applied for verification of transmit and receive circuitry through parametric measurements made over PUSCH transmissions for UE 351 under test.

Below formulae in different combinations can be used as additional methods to derive the desired downlink (DL) and uplink (UL) parametric measurement verification:

$$P_{PUSCH,c}(i) = \min\begin{cases} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{cases}$$

Assume that eNB sets the $P_{CMAX,c}(i)$, to a value high enough that following is true.

$P_{PUSCH,c}(i) = \{10 \log_{10}(M_{PUSCH,c}(i)) + P_{O\_PUSCH,c}(j) + \alpha_c(j) \cdot PL_c + \Delta_{TF,c}(i) + f_c(i)\}$ Where, $PL_c$ is $PL_{c,DL}$, DL path loss as measured by the UE and $P_{PUSCH,c}(i)$ is $P_{PUSCH,c,UE}(i)$ is the PUSCH power transmitted by the User Equipment (UE).

$P_{PUSCH,c,TE}(i) = P_{PUSCH,c,UE}(i) - PL_{c,UL}$ where, $P_{PUSCH,c,TE}(i)$ is the PUSCH power measured by the Test Equipment (TE) and $PL_{c,UL}$ is the UL path loss.

Therefore the above equation could be realized as:

$P_{PUSCH,c,TE}(i) + PL_{c,UL} = 10 \log_{10}(M_{PUSCH,c}(i)) + P_{O\_PUSCH,c}(j) + \alpha_c(j) \cdot PL_{c,DL} + \Delta_{TF,c}(i) + f_c(i)$ When the UE is commanded with accumulation enabled and TPC command $\delta_{PUSCH,c}$=1, $f_c(i)$=0

$P_{PUSCH,c,TE}(i) + PL_{c,UL} = 10 \log_{10}(M_{PUSCH,c}(i)) + P_{O\_PUSCH,c}(j) \alpha_c(j) \cdot PL_{c,DL} + \Delta_{TF,c}(i)$ As detailed above, parameters like $M_{PUSCH,c}(i)$, $P_{O\_PUSCH,c}(j)$ and $\Delta_{TF,c}(i)$ are controlled by the test equipment and shall be considered to hold a constant value for the duration of the test. The $PL_{c,UL}$ and $PL_{c,DL}$ path loss is also constant for a given DUT, given test setup and frequency/band of operation. Therefore, $P_{PUSCH,c,TE}(i) = \alpha_c(j) \cdot PL_{c,DL} + C_c$, where $C_c$ represents the constants and known parameters in the above equation for a given test configuration.

Therefore, by simplifying the equation to take advantage of the its linear characteristics, this embodiment provides a method to derive the actual value of $PL_{c,DL}$ by making measurements of $P_{PUSCH,c,TE}(i)$ under different $\alpha_c(j)$ values as follows: $P_{PUSCH,c,TE1}(i) = \alpha_{c1}(j) \cdot PL_{c,DL} + C_c$ $$P_{PUSCH,c,TE2}(i) = \alpha_{c2}(j) \cdot PL_{c,DL} + C_c$$

Therefore, $$PL_{c,DL} = (P_{PUSCH,c,TE2}(i) - P_{PUSCH,c,TE1}(i))/(\alpha_{c2}(j) - \alpha_{c1}(j)) \quad \text{(EQ. 5)}$$

With $PL_{c,DL}$ calculated as above, the test equipment shall accurately estimate the RSRP measured by the UE using the known peak and the average cell power as follows:

$$P_{refRx} = P_{refTx} - PL_{c,DL}$$

This estimated $P_{refRx}$ shall be verified against the UE reported RSRP in the measurement reports to validate the reliability of UEs receiver chain.

An accurate measure of the $PL_{c,UL}$ could also be derived by applying the calculated $PL_{c,DL}$ in following equation EQ. 6:

$$PL_{c,UL} = 10 \log_{10}(M_{PUSCH,c}(i)) + P_{O\_PUSCH,c}(j) + \alpha_c(j) \cdot PL_{c,DL} + \Delta_{TF,c}(i) - P_{PUSCH,c,TE}(i)$$

Upon measurement of $PL_{c,UL}$, the $P_{PUSCH,c,UE}(i)$ can be deduced based upon the reception of $P_{PUSCH,c,TE}(i)$.

Figure 7:
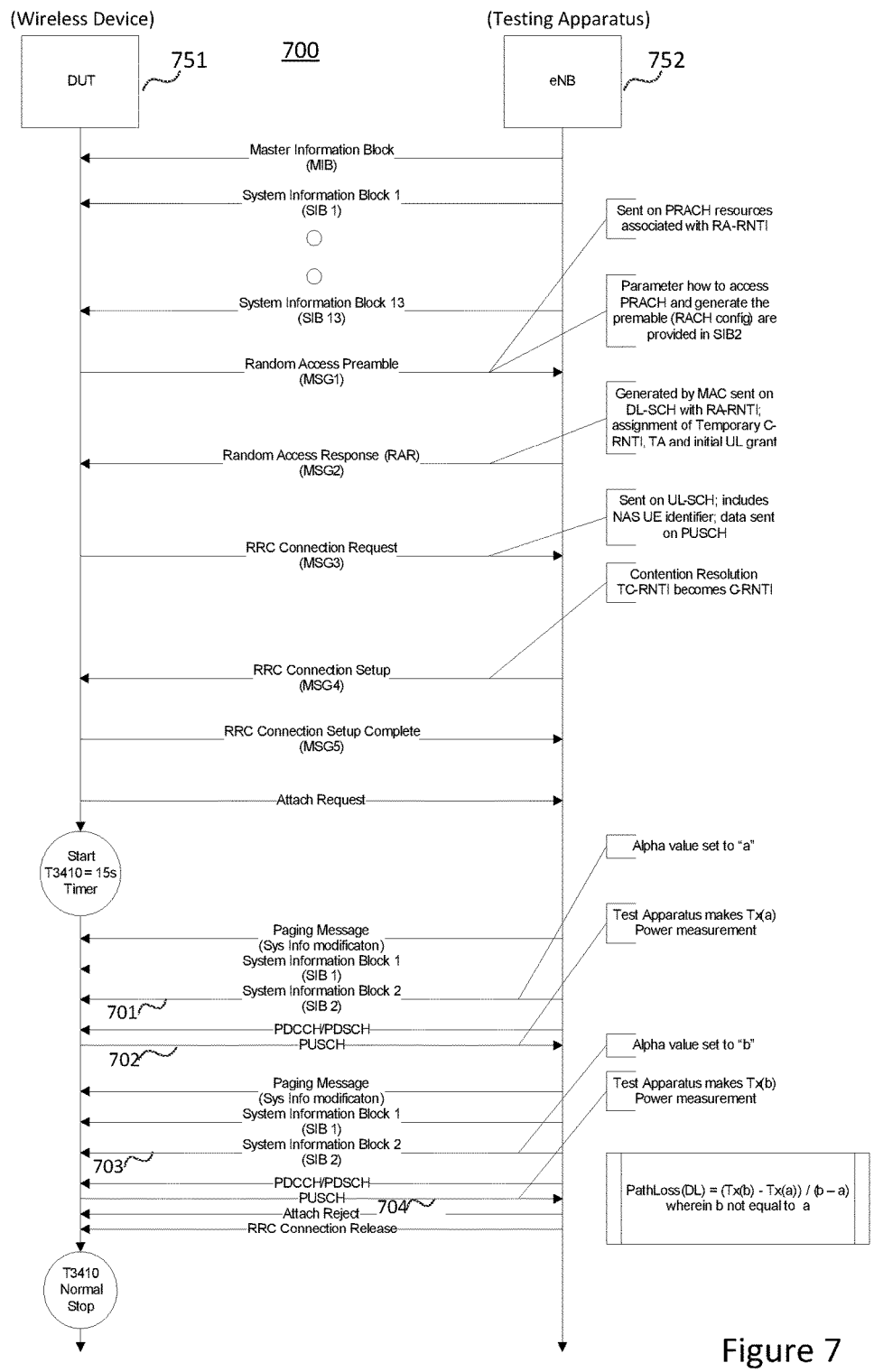
FIG. 7 shows a measurement procedure in which testing apparatus performs parametric measurements with mathematical equations in accordance with an embodiment.

FIG. 7 depicts the above procedure 700. Testing apparatus 752 sends system information block 2 (SIB 2) 701 with a first alpha value. Wireless device 751 subsequently transmits at a first transmitted power level over PUSCH 702, which is measured by testing apparatus 752. Testing apparatus 752 subsequently sends SIB 2 703 with a second alpha value, which is different from the first alpha value. Wireless device 751 consequently transmits at a second transmitted power level over PUSCH 704 as measured by testing apparatus 752.

Testing apparatus 752 then determines the downlink path loss from EQ. 5 and the uplink path loss from EQ. 6. (Typically, the second alpha value is sufficiently different from the first alpha value so that the determined downlink path loss based on EQ. 5 is sufficiently insensitive to measurement inaccuracies.) With the uplink power loss determined, testing apparatus 752 is able to determine the power level transmitted by wireless device 751 from the measured PUSCH power level.

Referring to FIG. 3, testing apparatus 352 also obtains intra-registration downlink measurements. Testing apparatus 352 sends RRC connection reconfiguration message 313 with measurement configuration. On receipt of the RRC connection reconfiguration message 313, UE 351 sets up its measurement configuration and sends the RRC connection reconfiguration complete message 314 back to the test apparatus. As per the measurement configuration, UE 351 sends measurement reports 315 back to the test apparatus. Testing apparatus 352 performs this procedure to determine the ability of UE 351 to correctly measure the reference signal received power, reference signal received quality and the total downlink channel power by comparing the UE reported reference signal received power (RSRP), reference signal received quality (RSRQ), and received signal strength indicator (RSSI) values against user defined thresholds in the frequencies being tested.

After completion of the downlink and uplink parametric measurements in a given frequency pair, procedure 300 and corresponding message scenario 400 shown in FIGS. 3 and 4, respectively, are repeated at step 319, in which testing apparatus 352 redirects the wireless device to next supported frequency pair until all the supported frequencies of UE 351 have been verified.

While testing apparatus 352 may be able to collect all of the desired uplink and downlink parameters for a given frequency pair, testing apparatus 352 may not be able to do so if the time duration of timer T3410 expires before all of the parameters are collected. For example, while timer T3410 expires in 15 seconds after initiation for LTE operation, other specifications may specify a different value of time expiration for the corresponding timer. In such a situation, testing apparatus 352 may direct UE 351 to the same frequency pair at step 319 in order to obtain the remaining parameters.

While procedure 300 shows uplink parameters being obtained before downlink parameters after registration, some embodiments may obtain downlink parameters before uplink parameters.

Figure 4A:
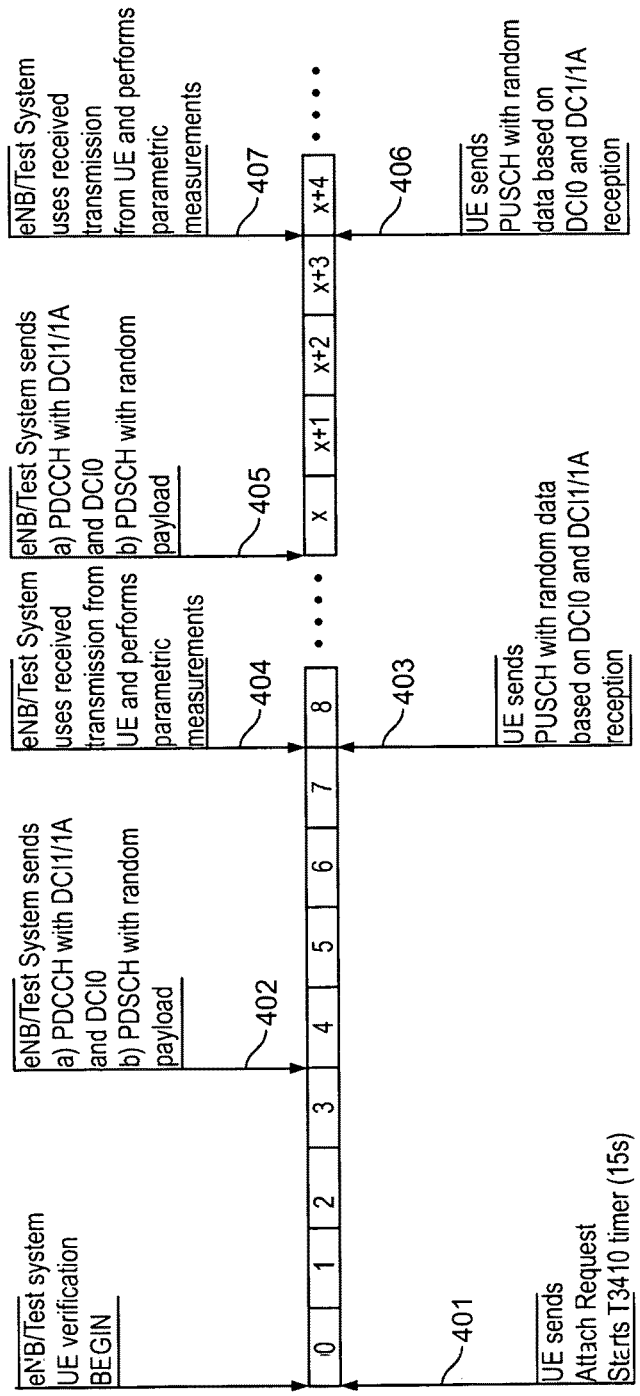
FIG. 4A shows a timeline when performing parametric measurements of a wireless device in accordance with an embodiment.
Figure 4B:
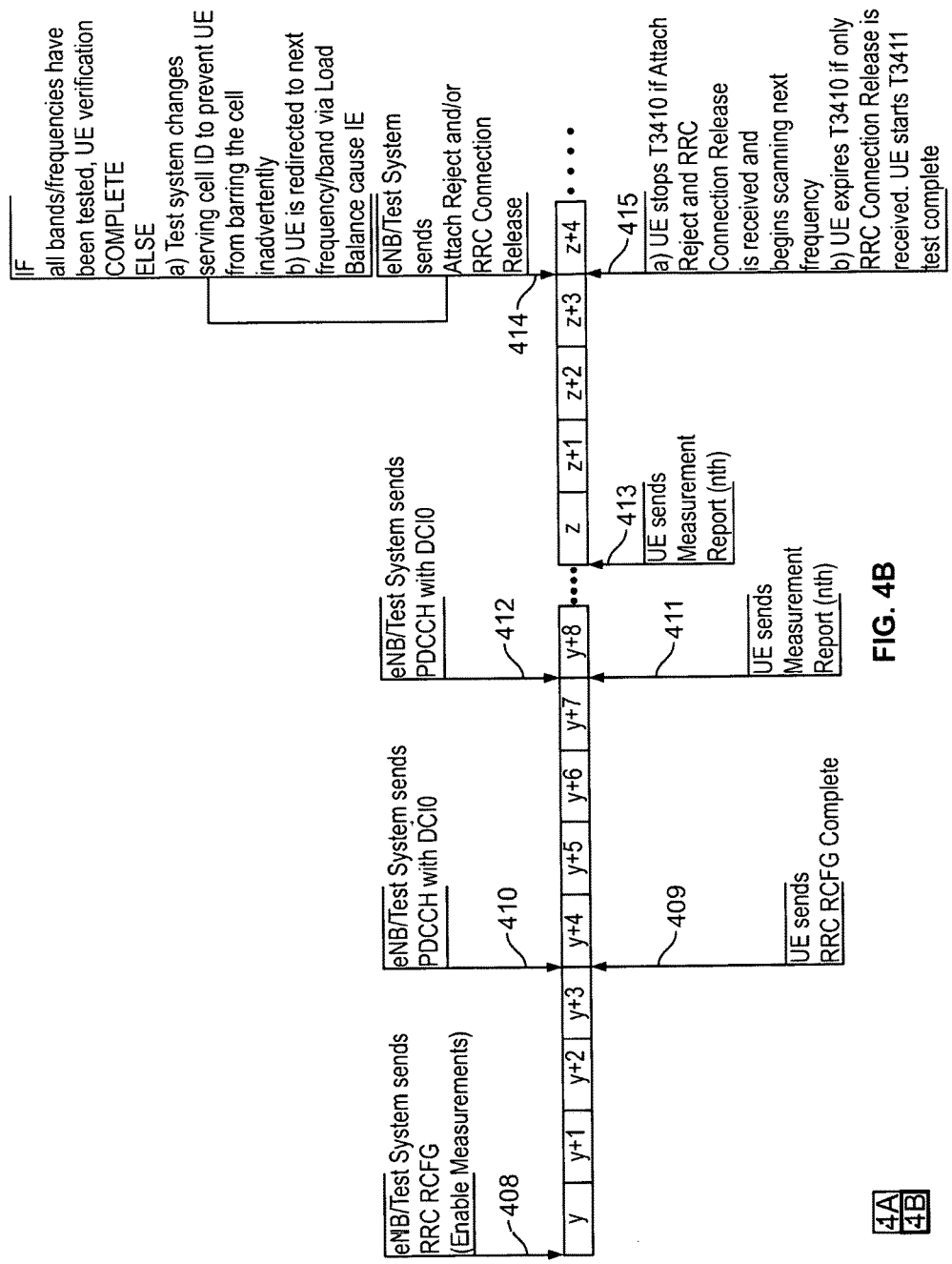
FIG. 4B shows a continued timeline of FIG. 4A in accordance with an embodiment.

FIGS. 4A-4B show a timeline 400 when performing parametric measurements of a wireless device (UE) 351 by testing apparatus 352 in the context of procedure 300, where each interval represents a transmission subframe (approximately 1 millisecond in duration for LTE operation) of the uplink and downlink. Testing apparatus 352 obtains uplink parameters during events 402-407 and downlink parameters during events 408-413.

Verification of wireless device 351 begins when testing apparatus 352 receives attach request message 309 from wireless device 352 at event 401, starting the T3410 timer (nominally set at 15 seconds).

In order to obtain uplink parameters for UE 351, testing apparatus 352 sends PDCCH 311a with possible downlink assignment of DCI indications via PDCCH 311b with a random payload at event 402. In response, UE 351 sends PUSCH 312 with the random data based on the received DCI indications at event 403. Subsequently, testing apparatus 352 uses the received transmission from UE 351 at event 404 to perform parametric measurements (e.g., uplink transmit power as well as BLER).

Additional uplink parameters may be obtained by repeating similar steps as events 402-404 at events 405-407. For example, testing apparatus 352 may instruct UE 351 to change the transmitted power level and determine the corresponding parametric measurement.

With an embodiment, testing apparatus 352 subsequently obtains downlink parameters at events 408-413. At event 408, testing apparatus 352 sends RRC reconfiguration message 313 with meas_cfg option set to UE 351 to initiate obtaining the downlink parameters. At event 409 UE 351 sends RRC reconfiguration complete message 314 and testing apparatus 352 sends PDCCH with DCI0 (not explicitly shown in FIG. 3) at event 410.

At event 411, UE 351 sends Measurement Reports message 315 with corresponding downlink parameters and testing apparatus 352 sends PDCCH with DCI0 (not explicitly shown in FIG. 3) at event 412. UE 351 subsequently returns additional downlink parameters in measurement reports messages (not explicitly shown in FIG. 3) at event 413. UE 351 may send one or more measurement reports messages, depending on the number of downlink parameters to be obtained. Downlink parameters may include the received downlink power level of the reference signal and the downlink BLER. Moreover, the same downlink parameter may be obtained a multiple times to improve the accuracy (e.g., by averaging).

When all of the downlink parameters are obtained for the configured frequency pair, testing apparatus 352 sends attach reject message 316 and/or RRC connection release message 317 at event 414. If testing apparatus 352 determines that another frequency pair is to be tested, both messages 316 and 317 are sent to UE 351 so that UE 351 stops timer T3410 and rescans the next frequency pair. Otherwise, testing apparatus 352 sends only RRC connection release message 317 so that UE 351 stops timer T3410 and starts timer T3411 to end the test, where timer T3411 provides a time duration during which UE 351 scans other cells to camp and attach.

When testing apparatus 352 redirects UE 351 to another frequency pair, testing apparatus 352 may change the serving cell identification to avoid UE 351 perceiving an error situation, thus barring the cell inadvertently.

Figure 5:
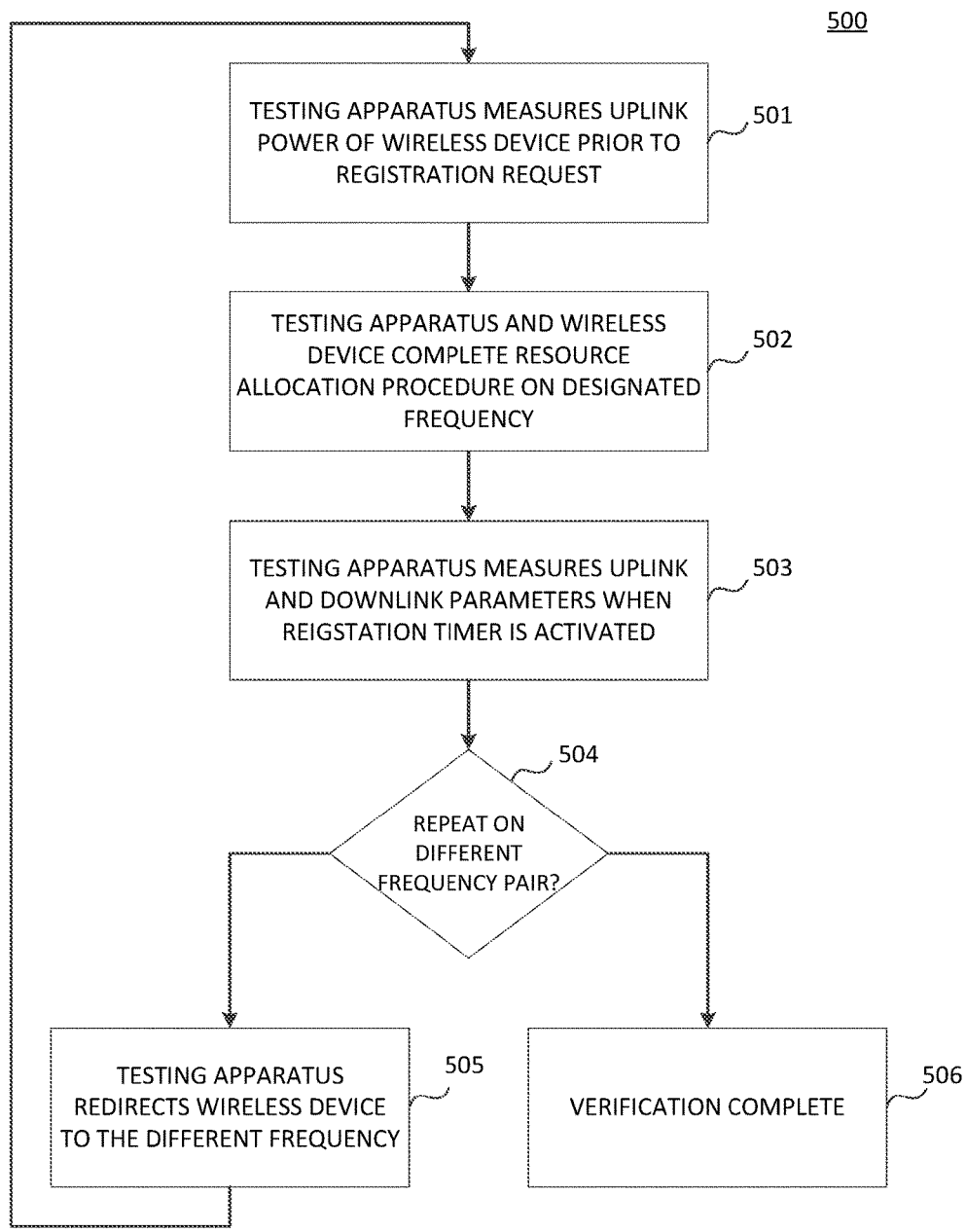
FIG. 5 shows a flowchart for a testing apparatus performing parametric measurements in accordance with an embodiment.

FIG. 5 shows flowchart 500 for testing apparatus 600 (as will be discussed with FIG. 6) performing parametric measurements for a wireless device in accordance with procedure 300 as shown in FIG. 3.

At block 501 testing apparatus 600 measures the uplink power level of wireless device 351 prior to receiving a registration request (attach request message 309 as shown in FIG. 3). For example, testing apparatus may determine the preamble transmission power $P_{PRACH}$ based on by EQ. 1 (which may be referred to as pre-registration measurements).

At block 502 testing apparatus 600 and wireless device 351 completes the resource allocation procedure on the designated frequency pair, Referring to procedure 300 as shown in FIG. 3, the resource allocation procedure is performed during steps 306-308.

At block 503 testing apparatus 600 measures uplink and downlink parameters after receiving a registration request (attach request message 309 as shown in FIG. 3) as performed during steps 311a,b-317. (As previously discussed, these measurements may be referred to as intra-registration measurements.) For example, testing apparatus may determine the uplink power level transmitted by UE 351 over PUSCH in accordance with EQ. 4.

At block 504 testing apparatus 600 determines whether testing should be repeated on a different frequency pair. If so, testing apparatus 600 performs step 319 so that UE 351 is redirected to the different frequency pair at block 505. The uplink and downlink parameters are subsequently obtained for the different frequency pair during repeated blocks 501-503.

At block 505, if testing apparatus 600 determines that all desired frequency pairs have been tested, testing apparatus 600 completes the verification process. For example, obtained uplink and downlink parameters may be compared to predetermined thresholds and a verification report is generated.

Figure 6:
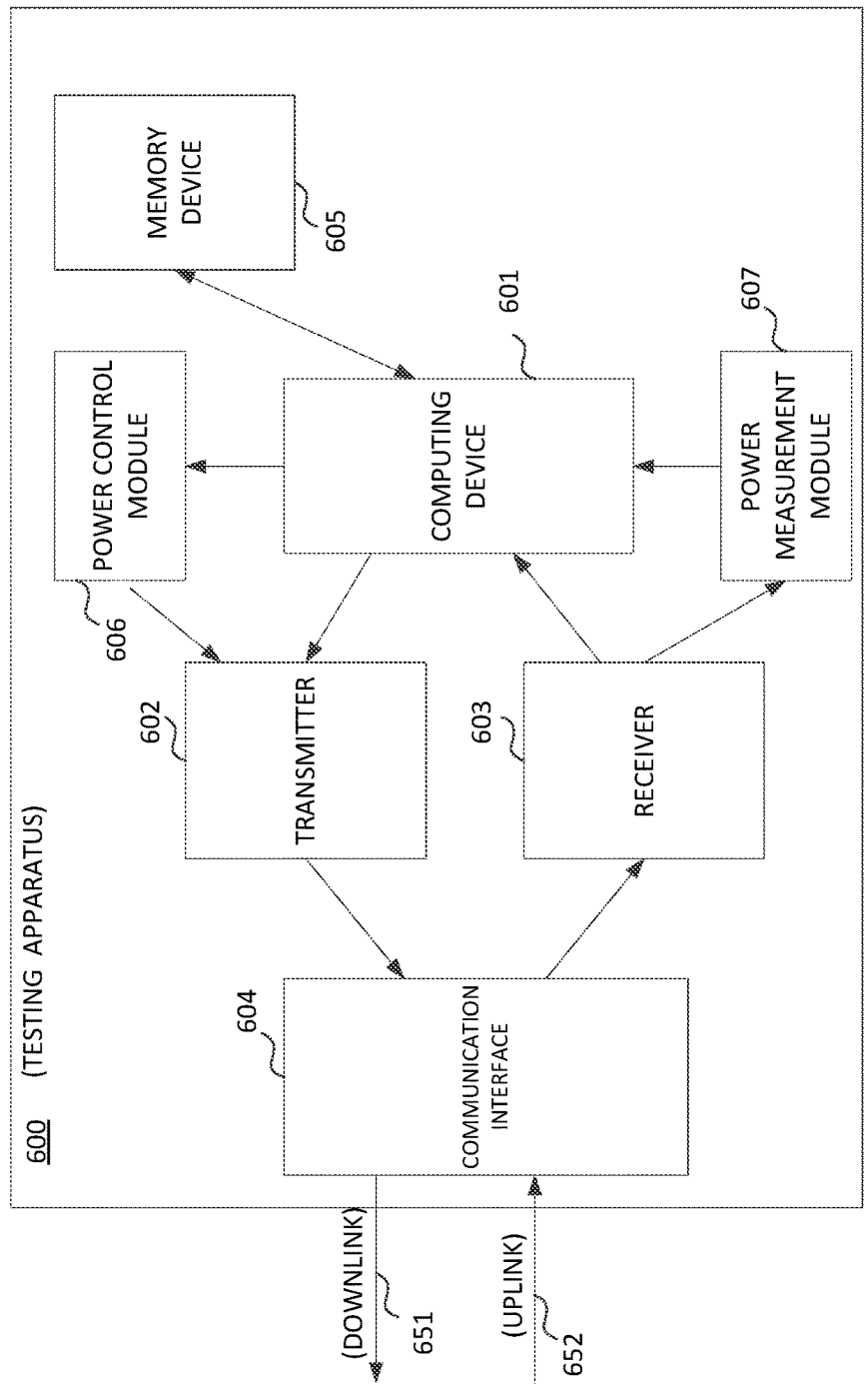
FIG. 6 shows a testing apparatus in accordance with an embodiment.

FIG. 6 shows testing apparatus 600 in accordance with an embodiment. Testing apparatus 600 communicates with a wireless device (not explicitly shown) over downlink channel 651 and uplink channel 652.

Testing apparatus 600 comprises computing device 601, transmitter 602, receiver 603, communication interface 604, memory 605, power control module 606, and power measurement module 607. Testing apparatus 600 communicates with the wireless device through communication interface 604 in accordance with processes 300, 400, and 500, where computing device 601 executing computer readable instructions stored in memory device 605.

Computer storage media 605 may include volatile and nonvolatile, removable and non-removable media implemented in any method or technology for storage of information such as computer readable instructions, data structures, program modules or other data. Computer storage media 605 include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 601.

With some embodiments, testing apparatus 600 may be built on a similar platform as an eNB (evolved Node B). With this approach, computer storage media 605 contains computer readable instructions to perform procedure 300. For example, testing apparatus may be implemented on a generic, "off the shelf" LTE platform that is based on the Micro Telecommunications Computing Architecture (MicroTCA®).

Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for performing a parametric measurement for a wireless device by a measuring apparatus, the method comprising: receiving, by the measuring apparatus, a first registration request from the wireless device, the first registration request indicative that the wireless device activated a timer; in response to the receiving the first registration request, sending a first transmitted message to the wireless device from the measuring apparatus; and in response to the sending of the first transmitted message, determining, by the measuring apparatus, a first uplink parameter based on a first received message from the wireless device, wherein the first uplink parameter is determined without security information for the wireless device and within a predetermined duration of the timer.

2. The method of claim 1 further comprising: in response to the receiving the first registration request, sending, by the measuring apparatus, a second transmitted message to the wireless device; and in response to the sending of the second transmitted message, determining, by the measuring apparatus, a first downlink parameter based on a second received message from the wireless device, wherein the first downlink parameter is determined without the security information for the wireless device by the measuring apparatus and within the predetermined duration of the timer.

3. The method of claim 2, wherein the first uplink parameter and first downlink parameter are obtained for a first configured radio resource at a first frequency pair, the method further comprising: redirecting, by the measuring apparatus, the wireless device to a second radio resource at a second frequency pair; receiving, by the measuring apparatus, a second registration request from the wireless device, the second registration request indicative that the wireless device reactivated the timer; in response to the receiving the second registration request, sending, by the measuring apparatus, a third transmitted message to the wireless device; and in response to the sending of the third transmitted message, determining, by the measuring apparatus, a second uplink parameter based on a third received message from the wireless device.

4. The method of claim 3 further comprising: in response to the determining of the second uplink parameter, sending, by the measuring apparatus, a fourth transmitted message to the wireless device; and in response to the sending of the fourth transmitted message, determining, by the measuring apparatus, a second downlink parameter based on a fourth received message from the wireless device.

5. The method of claim 3 further comprising: changing, by the measuring apparatus, a serving cell identification when redirecting the wireless device.

6. The method of claim 3, further comprising: determining frequency pairs at which the wireless device should be tested; repeating the redirecting and determining the uplink and downlink parameters for all said frequency pairs; and comparing the uplink and downlink parameters with predetermined thresholds.

7. The method of claim 2, wherein:
the wireless device is Long-Term Evolution (LTE) compliant;
the first registration message comprises an attach request message;
the first transmitted message comprises a physical downlink control channel (PDCCH) message;
the first received message comprises a physical uplink shared channel (PUSCH) message;
the second transmitted message comprises a radio resource control (RRC) reconfiguration message; and
the second received message comprises a measurement reports message.

8. The method of claim of claim 2 further comprising:
when the timer expires before all uplink and downlink parameters for the first frequency pair have been determined, redirecting the wireless device to a second radio resource at the first frequency pair; and
determining the remaining uplink and downlink parameters for the first frequency pair.

9. The method of claim 1 further comprising: prior to the receiving of the registration request, measuring, by the measuring apparatus, a transmitted power level of the wireless device on an uplink channel.

10. The method of claim 9, wherein:
the wireless device is Long-Term Evolution (LTE) compliant; and
the measuring is performed on a physical random access channel (PRACH).

11. The method of claim 1, wherein the timer comprises a T3410 timer.

12. The method of claim 1, wherein the wireless device is installed with an electronic system identity module (e-SIM) card or hardware SIM card (such as Machine Identification Module MIM).

13. A non-transitory computer-readable medium storing computer-executable instructions that, when executed by a processor, cause an apparatus to perform: receiving a registration request from a wireless device, the registration request indicative that the wireless device activated a timer; in response to the receiving the registration request, sending a first transmitted message to the wireless device; in response to the sending of the first transmitted message, determining an uplink parameter based on a first received message from the wireless device; in response to receiving the first received message from the wireless device, sending a second transmitted message to the wireless device; and in response to the sending of the second transmitted message, determining a downlink parameter based on a second received message from the wireless device, wherein the uplink parameter and downlink parameter are determined without the security information for the wireless device and within the predetermined duration of the timer.

14. The non-transitory computer-readable storage medium of claim 13, wherein the computer-executable instructions, when executed, cause the processor to perform:
obtaining the first uplink parameter and first downlink parameter for a first configured radio resource at a first frequency pair;
redirecting the wireless device to a second radio resource at a second frequency pair;
receiving a second registration request from the wireless device, the second registration request indicative that the wireless device reactivated the timer;
in response to the receiving the second registration request, sending a third transmitted message to the wireless device; and
in response to the sending of the third transmitted message, determining a second uplink parameter for the second frequency pair based on a third received message from the wireless device.

15. The non-transitory computer-readable storage medium of claim 14, wherein the computer-executable instructions, when executed, cause the processor to perform:
sending a fourth transmitted message to the wireless device; and
in response to the sending of the fourth transmitted message, determining a second downlink parameter for the second frequency pair based on a fourth received message from the wireless device.

16. The non-transitory computer-readable storage medium of claim 15, wherein the computer-executable instructions, when executed, cause the processor to perform: determining frequency pairs at which the wireless device should be tested; repeating the redirecting and determining the uplink and downlink parameters for all said frequency pairs; and changing a serving cell identification when redirecting the wireless device.

17. A testing apparatus for verifying operation of a wireless device, the testing apparatus comprising: at least one memory device; at least one processor coupled to the at least one memory device and configured to perform, based on instructions stored in the at least one memory device: receiving a first registration request from the wireless device, the first registration request indicative that the wireless device activated a timer; in response to the receiving first registration request, sending a first transmitted message to the wireless device; in response to the sending of the first transmitted message, determining a first uplink parameter based on a first received message from the wireless device, wherein the first uplink parameter is determined without authentication of the wireless device and within a predetermined duration of the timer; in response to the receiving the first registration request, sending a second transmitted message to the wireless device; and in response to the sending of the second transmitted message, determining a first downlink parameter based on a second received message from the wireless device, wherein the first downlink parameter is determined without security information for the wireless device and within the predetermined duration of the timer.

18. The apparatus of claim 17, wherein the at least one processor is further configured to perform: determining frequency pairs at which the wireless device should be tested; and repeating the redirecting and determining the uplink and downlink parameters for all said frequency pairs.

19. The apparatus of claim 17, wherein:
the wireless device is Long-Term Evolution (LTE) compliant;
the first registration message comprises an attach request message;
the first transmitted message comprises a physical downlink control channel (PDCCH) message;
the first received message comprises a physical uplink shared channel (PUSCH) message;
the second transmitted message comprises a radio resource control (RRC) reconfiguration message; and
the second received message comprises a measurement reports message.

20. The apparatus of claim 19, wherein the timer comprises a T3410 timer and wherein the at least one processor is further configured to perform:
when the T3410 timer expires before all uplink and downlink parameters for the first frequency pair have been determined, redirecting the wireless device to a second radio resource at the first frequency pair; and determining the remaining uplink and downlink parameters for the first frequency pair.

21. A method for performing a parametric measurement for a wireless device by a measuring apparatus, wherein the wireless device is Long-Term Evolution (LTE) compliant, the method comprising: receiving, by the measuring apparatus, a registration request from the wireless device, the first registration request indicative that the wireless device activated a timer; in response to the receiving the first registration request, sending a first system information block 2 (SIB 2) message to the wireless device from the measuring apparatus, wherein the first SIB 2 message conveys a first alpha value; measuring, by the measuring apparatus, a first PUSCH power level in accordance with the first alpha value; sending a second system information block 2 (SIB 2) message to the wireless device from the measuring apparatus, wherein the second SIB 2 message conveys a second alpha value; measuring, by the measuring apparatus, a second PUSCH power level in accordance with the second alpha value; determining, by the measuring apparatus, a downlink path loss from the first and second measured PUSCH power levels; and determining, by the measuring apparatus, an uplink path loss from the determined downlink path loss, wherein the measurements are determined without security information for the wireless device by the wireless device and within a predetermined duration of the timer.

22. The method of claim 21 further comprising:
determining, by the measuring apparatus, a transmitted power level transmitted by the wireless device from the uplink path loss and a third measured PUSCH power level.

23. The method of claim 21, wherein the determining of the downlink path loss comprises: determining a first difference between the second PUSCH power level and the first PUSCH power level; determining a second difference between the second and first alpha values; and dividing the first difference by the second difference.

* * * * *